UNITED STATES PATENT OFFICE.

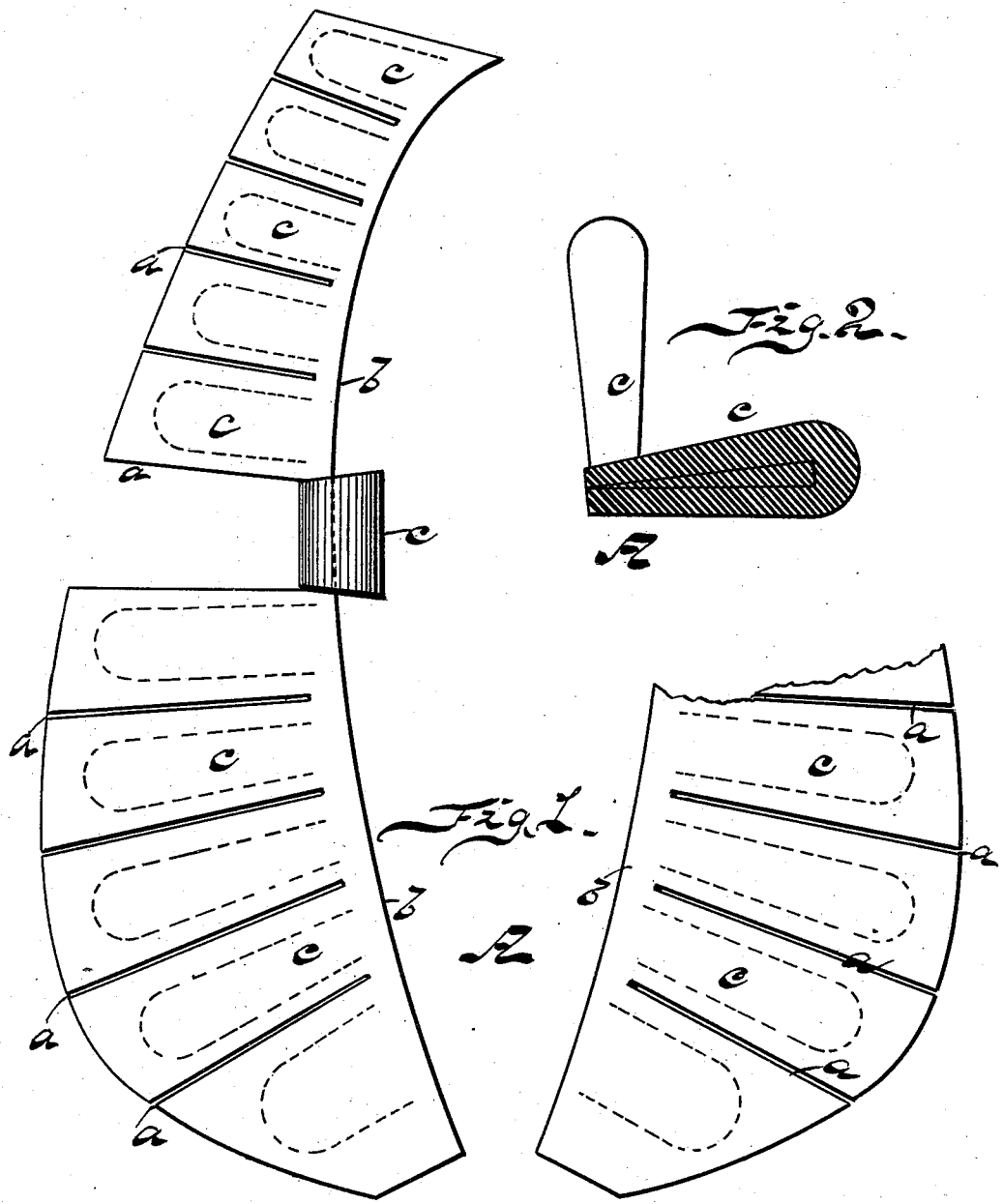

JAPHET S. CUSSON, OF DE KALB, ILLINOIS.

HARNESS-PAD.

SPECIFICATION forming part of Letters Patent No. 362,431, dated May 3, 1887.

Application filed March 1, 1887. Serial No. 229,345. (No model.)

*To all whom it may concern:*

Be it known that I, JAPHET S. CUSSON, a citizen of the United States, residing at De Kalb, in the county of De Kalb and State of Illinois, have invented certain new and useful Improvements in Sweat-Pads; and I do hereby declare the following to be a full, clear, and exact description of the invention, such as will enable others skilled in the art to which it appertains to make and use the same.

This invention has relation to improvements in sweat-pads for horse-collars; and it consists in providing a sectional pad whereby ventilation is obtained between the collar and neck and at the same time afford means for relieving any sore on the neck from pressure of the collar or pad, all as will be hereinafter fully explained, and shown in the drawings.

The annexed drawings, to which reference is made, illustrate my invention, in which—

Figure 1 represents a front view of my device, and Fig. 2 is a horizontal sectional view of one-half of the pad.

Referring by letter to the accompanying drawings, A designates the sweat-pad, the contour of which is cut to that of a horse-collar, and the same is transversely cut, as at $a$, to within a short distance of the edge $b$ of the inner portion of the pad, thus leaving the inner part integral from the top to the bottom of said pad. The sections $c$ are preferably of double thickness, and the two thicknesses are stitched to one another, as shown.

It will be seen by reference to the drawings and the above description that the sections, being separated, allow ventilation between the collar and the neck or shoulder of the horse, and, should the animal have a sore shoulder, one or more of said sections can be turned outwardly, and a space is therefore provided between the collar and animal, thus relieving the sore from any pressure; and, should it be desired, any number of the sections could be projected forward, and it is easily adjusted to the horse's neck and cheap to manufacture.

What I claim is—

The sweat-pad herein described, consisting of the pad A, having transverse slits $a$, extending nearly to the opposite edge, separating the pad into sections $c$, whereby each individual section can be turned outwardly, as and for the purpose set forth.

In testimony whereof I affix my signature in presence of two witnesses.

JAPHET S. CUSSON.

Witnesses:
WILLIAM L. POND,
CHASE E. GLIDDEN.